United States Patent [19]
Shoji et al.

[11] B  4,000,220
[45]  Dec. 28, 1976

[54] METHOD FOR PRODUCING THERMOPLASTIC RESIN

[75] Inventors: Fusaji Shoji; Hisashi Kohgame; Tadashi Muroi, all of Hitachi, Japan

[73] Assignees: Hitachi, Ltd.; Hitachi Chemical Company, Ltd., Japan

[22] Filed: May 13, 1974

[21] Appl. No.: 469,468

[44] Published under the second Trial Voluntary Protest Program on March 16, 1976 as document No. B 469,468.

Related U.S. Application Data

[63] Continuation-in-part of Ser. No. 269,762, July 7, 1972, abandoned.

[30] Foreign Application Priority Data

July 9, 1971  Japan .............................. 46-50281

[52] U.S. Cl. .................. 260/878 R; 260/880 R
[51] Int. Cl.² ............... C08L 23/26; C08F 255/06; C08F 255/10
[58] Field of Search .................... 260/878 R, 880 R

[56]  References Cited

UNITED STATES PATENTS

| | | |
|---|---|---|
| 3,538,190 | 11/1970 | Meredith et al. .............. 260/878 R |
| 3,538,191 | 11/1970 | Meredith et al. .............. 260/878 R |
| 3,538,192 | 11/1970 | Bishop, Sr. ...................... 260/878 R |
| 3,538,193 | 11/1970 | Meredith ....................... 260/878 R |
| 3,642,950 | 2/1972 | O'Shea ......................... 260/878 R |
| 3,676,528 | 7/1972 | Severini et al. ................ 260/878 R |
| 3,819,765 | 6/1974 | O'Shea ......................... 260/878 R |

*Primary Examiner*—Alan Holler
*Attorney, Agent, or Firm*—Craig & Antonelli

[57]  ABSTRACT

The invention relates to a method for producing a thermoplastic resin useful particularly as an engineering plastics, which comprises suspending in an aqueous medium a solution comprising (a) a non-polar rubbery polymer having an iodine value of 2 to 40, (b) an aromatic vinyl monomer, (c) an aliphatic vinyl monomer, and a small amount of an organic solvent, and suspension-polymerizing in the presence of a polymerization initiator.

26 Claims, No Drawings

METHOD FOR PRODUCING THERMOPLASTIC RESIN

CROSS REFERENCE TO THE RELATED APPLICATION

This application is a continuation-in-part of application Ser. No. 269762 filed July 7, 1972, now abandoned.

This invention relates to a method for producing a thermoplastic resin, and more particularly to a method for producing a thermoplastic resin useful particularly as an engineering plastics, which comprises suspending in an aqueous medium a solution comprising (a) a non-polar rubbery polymer having an iodine value of 2 to 40, (b) an aromatic vinyl monomer, (c) an aliphatic vinyl monomer, and a small amount of an organic solvent, and suspension-polymerizing in the presence of a polymerization initiator.

A copolymer, for example, acrylonitrile-butadiene-styrene copolymer resin (ABS resin), which is obtained from an aliphatic vinyl monomer, a diene-based rubbery polymer and an aromatic vinyl monomer, has been widely used as a resin excellent in impact strength. However, such a resin contains a diene-based rubbery polymer having double bonds, such as polybutadiene, in its molecule as a building component. Consequently, such a resin easily deteriorates in air, particularly when exposed to ultraviolet rays in the open-air, resulting in such defects that marked decrease in impact strength as well as in elongation and development of cracks of the surface are observed. Therefore, in order to protect from deterioration when exposed to the open-air, the said resin has been incorporated with various stabilizers including an ultraviolet absorber, antioxidant, heat stabilizer and light stabilizer. However, in every case, these stabilizers are effective only to such a degree that a little improvement is observed, and weatherability of the resin is still considerably inferior to other thermoplastic resins without containing a diene-based rubbery polymer. From the viewpoint that in order to overcome the above difficulties it is necessary to use a rubbery polymer having little double bonds in place of a diene-based rubbery polymer, there have been proposed various methods which utilize, for example, acryl rubber, ethylene-propylene rubber (EPR), ethylene-propylenediene rubber (EPDM rubber), butyl rubber, ethylene-vinyl acetate copolymer, chlorosulfonated polyethylene or chlorinated polyethylene. These methods have much contributed to the improvement in weatherability. These rubbers are used in a proportion of 5 to 25% by weight based on the vinyl monomer in order to ensure balance of mechanical characteristics, such as impact resistance, tensile strength, etc., in the resulting resin. The objective resin has been prepared by graft-polymerizing a vinyl monomer such as acrylonitrile or styrene onto these rubbers by the technique of emulsion polymerization, bulk polymerization or solution polymerization. However, the bulk polymerization method has such a disadvantage that as the polymerization proceeds, viscosity of the reaction system is markedly increased until stirring becomes difficult or insufficient in some cases, resulting in non-uniformity of the resin composition. Thus, it is impossible to produce a homogeneous resin by this method. On the other hand, the solution polymerization method requires a large amount of solvent which must be removed in the final step where the product resin is separated and purified. The procedure of said removal of the solvent is inefficient, making the polymerization method uneconomical. Aside from the bulk polymerization method and solution polymerization method, it is possible to produce the objective resin by first converting the solid rubbery polymer into a latex form, and then applying to the latex a relatively simple emulsion polymerization technique similar to that for producing an ABS resin. However, conversion of the solid rubbery polymer into a latex form adds to the expense and, moreover, it is difficult to obtain a stable latex.

In order to improve the conventional method for producing an impact resistant resin, the present inventors conducted a series of researches to overcome the above-mentioned difficulties in the manufacturing procedure while retaining those advantages of a rubbery polymer containing small proportions of a diene component which are evidenced by ethylene-propylene copolymer, ethylene-propylene-diene rubbery polymer, and butyl rubber. They examined from various angles the method disclosed in U.S. Pat. No. 3,538,191 for producing a resin having an excellent impact resistance and weather resistance. As a result, the following facts were made clear. Advantages of the method are such that firstly, the method is capable of producing a thermoplastic resin with excellent weather resistance as well as excellent thermal stability which have never been observed with ABS resin and secondly, it is possible to use a rubbery polymer component, such as EPDM rubber, which is insoluble in a monomer, such as acrylonitrile, which is another reactant. On the other hand, disadvantages of the method to be improved are such that firstly the heat of polymerization is difficultly controllable, secondly, stirring becomes difficult in later stage of polymerization, and thirdly, isolation and purification procedures are complicated, time-consuming and expensive.

The present inventors concluded that the abovementioned disadvantages originate from graft-polymerization in solution. In these respects, the suspension polymerization method seemed to be superior to the solution polymerization method.

In the case of ABS resin, it has been well known that preparation of the resin by suspension polymerization method encounters poor dispersibility of the rubber component and that even if prepared by this method with much efforts the product resin is of low commercial value. Taking this fact into account, it was presumed that it must be practically impossible to obtain a resin having excellent impact strength and other mechanical characteristics from the starting materials disclosed in the aforementioned U.S. Patent by the suspension method. The presumption was proved to be correct by experiments.

The present inventors then conducted experiments on the application of the procedure disclosed in said U.S. Patent to the case of suspension polymerization. It was found that when suspension polymerization was conducted using the solvent in an amount within the range as specified in said patent specification, there appeared an unfavorable phenomenon of agglomeration of the suspended particles (particles of the formed resin) as the polymerization proceeded, resulting in destruction of the suspension system. As a result of detailed experiments, the present inventors unexpectedly found that it is possible to eliminate the above-mentioned difficulties by reducing the amount of solvent to 5 to 50 percent by weight based on total weight of the starting materials (i.e. total weight of the reactants), which amount being less than that used in the conventional solution polymerization method (about 150 percent by weight or more). Based on this finding, this invention has been accomplished.

The first object of this invention is to provide a thermoplastic resin excellent in impact resistance and weather resistance.

The second object of this invention is to provide a production method which is simple in procedures of polymerization and of isolation as well as purification of the reaction product.

The third object of this invention is to provide a low-cost production method.

Other objects of this invention will become apparent from the following description.

This invention is characterized by comprising the steps of preparing a solution by dissolving 5 to 45 parts by weight of (a) at least one substantially non-polar rubbery polymer selected from the group consisting of ethylene-propylene-diene rubber, butyl rubber and mixtures thereof having an iodine value of 2 to 40, and 95 to 55 parts by weight of vinyl monomer components including 2 to 98 percent by weight of (b) an aromatic vinyl monomer and 98 to 2 percent by weight of (c) an aliphatic vinyl monomer represented by the general formula $CH_2 = C(R)X$ (wherein R is hydrogen, a methyl or ethyl group, and X is $-CN$, $-COOH$, $-COOCH_3$ or $-COOC_2H_5$) in an organic solvent capable of dissolving said non-polar rubbery polymer, the amount of the solvent being 5 to 50 parts by weight per 100 parts by weight of the total of said components (a), (b) and (c); suspending 100 parts by weight of said solution in 70 to 400 parts by weight of an aqueous medium for forming a suspension of said solution suitable for suspension polymerization; and suspension-polymerizing in the presence of a polymerization initiator.

By the method of this invention, the suspension polymerization has been made possible even when a solid non-polar rubbery polymer was used as the rubbery polymer component, and hence the graft polymer, i.e. the reaction product, is obtained in the form of granules which can be more easily separated from the aqueous medium as compared with the product of solution polymerization. The procedure is very simple and can be carried out efficiently. The residual solvent can easily be removed by steam distillation to economical advantage. Contrary to a bulk polymerization method for high-impact polystyrene as reported in the literature, the suspension polymerization according to this invention has an advantage in that the rubber component easily forms a discontinuous phase without necessitating phase inversion from a continuous phase containing rubber into a discontinuous phase. Moreover, according to this invention rubber forms the discontinuous phase more easily and more surely than when phase inversion is carried out. This advantage further contributes to the impact strength, tensile strength and luster of the product.

The substantially non-polar rubbery polymers having an iodine value of 2 to 40 to be used as the component (a) in this invention are, for example, ethylene-propylene-diene rubber (EPDM rubber), and butyl rubber. These are used each alone or in mixtures of two or more. By using a rubbery polymer having an iodine value of 2 to 40, which means the presence of very few or rather few double bonds, weather resistance of the product resin can be improved without imparing impact resistance. When a rubbery polymer with an iodine value of less than 2 is used, graft-polymerization will be incomplete and the density of cross-linkage will be low, both resulting in marked deterioration of mechanical characteristics, such as tensile strength, elongation, bending strength, and particularly impact resistance, of the resin. On the other hand, when a rubbery polymer having an iodine value of more than 40 is used, owing to excessive content of diene component, resins having excellent weather resistance and thermal stability are hardly to obtain. A rubbery polymer having a Mooney viscosity, $ML_{1+4}(100°C)$, of 25 to 120 is most useful as the non-polar rubbery polymer. Rubbery polymers having too low Mooney viscosities tend to decrease tensile strength of the objective resin, while rubbery polymers having too high Mooney viscosities tend to deteriorate impact resistance.

In this invention, for the purpose of promoting graft-polymerization or formation of cross-linkages within the rubbery polymer, the latter can be previously provided with grafting sites by contacting with air or oxygen in the presence of an organic peroxide while being heated to form peroxide groupings on the polymer molecule or by exposing to an electron beam, γ-ray or electromagnetic wave.

The aromatic vinyl monomers to be used as the component (b) are, for example, styrene, vinyltoluene, chlorostyrene, α-alkylstyrenes, α-chlorostyrene, N-vinylcarbazole and vinyl-naphthalene. These are used each alone or in mixtures of two or more.

The aliphatic vinyl monomers represented by the aforementioned formula for use as the component (c) are, for example, acrylonitrile, acrylic acid, methyl methacrylate, ethyl methacrylate, methacrylonitrile, methyl acrylate, and ethyl acrylate. These are used each alone or in mixtures of two or more. The aliphatic vinyl monomers enumerated above have the advantage of low price, whilst others result in increased production cost and are accordingly less useful.

In the present invention, at least one member selected from each component (a), rubbery polymer, component (b), aromatic vinyl monomer, and component (c), aliphatic vinyl monomer, is used. The proportion of each component should be suitably selected according to the desired characteristics of the objective resin. General relation between the components mentioned above and the characteristics of the objective resin is as follows: For instance, impact resistance is improved with an increase in the proportion of the rubbery polymer component; a resin excellent in moldability results from increased proportion of the aromatic vinyl monomer component; increased proportion of the aliphatic vinyl monomer component, particularly acrylonitrile, results in improving in luster, heat resistance and stiffness; and a resin having excellent transparency can be obtained by increasing the proportion of methyl methacrylate. In view of the above-mentioned facts, the proportion of each component is preferably 5 – 45 percent by weight of the rubbery polymer component (a) and 95 – 55 percent by weight of the vinyl monomer components (b) and (c), more preferably 10–30 percent by weight of the rubbery component (a) and 90–70 percent by weight of the vinyl monomer components (b) and (c). The weight ratio of the aromatic vinyl monomer to the aliphatic vinyl monomer is preferably 2–98 to 98–2, more preferably 60–80 to 40–20.

Explanation is given below concerning the solvent characteristic to this invention.

As previously mentioned, using a non-polar or slightly polar rubbery polymer such as EPDM rubber or butyl rubber, a graft polymer can be prepared by the suspension polymerization technique. This has been made possible by the use of an organic solvent capable of dissolving the above-mentioned rubbery polymer and by limiting the proportion of solvent within a specified range: i.e. 5 to 50 parts by weight of the solvent against 100 parts by weight of the total components of (a), (b) and (c). If the solvent is used in an amount outside the specified range, the object of this invention cannot be achieved for the following reasons. When the amount of the solvent is 5 parts by weight or less, the effect of addition of the solvent becomes hardly recognizable, and the satisfactory compatibility of the rubbery polymer with the solvent is disturbed. Consequently, it is hardly possible to obtain a resin of uniform composition, that is, a homogeneous resin. On the other hand, when the amount of the solvent is 50 parts by weight or more, suspended particles of high viscosity tend to agglomerate with progress of the reaction until the suspension polymerization becomes impossible. The more preferred amount of the solvent is 20–45 parts by weight based on 100 parts by weight of the total components of (a), (b) and (c).

Examples of organic solvents for use in this invention are aromatic hydrocarbons such as benzene, toluene, xylene, ethylbenzene and diethylbenzene; paraffinic hydrocarbons such as pentane, hexane, naphtha (a petroleum distillate containing pricipally aliphatic hydrocarbons and boiling usually higher than gasoline and lower than kerosine), 3-methylpentane, 2-methylpentane, 2,2-dimethylpentane, 2,4-dimethylpentane, heptane, octane, nonane and decane; saturated cyclic hydrocarbons such as cyclopentane, cyclohexane, methylcyclopentane and methylcyclohexane; chlorine derivatives of the above-mentioned aromatic hydrocarbons and paraffinic hydrocarbons such as chlorobenzene, dichlorobenzene, chloroform, carbon tetrachloride and dichloromethane. These solvents capable of dissolving the aforementioned rubbery polymer component are used each alone or in mixtures.

In this invention, joint use of an aromatic solvent and an aliphatic solvent brings about such desirable results that dispersibility of the rubbery polymer is improved and mechanical characteristics of the resin are also improved owing presumably to the development of favorable conditions for the promotion of graft-polymerization. Especially preferable solvents are at least one aromatic solvent selected from benzene, toluene, xylene and ethylbenzene, and at least one aliphatic solvent selected from heptane, hexane, octane, nonane and naphtha.

Polymerization initiators for use in this invention are those of oil-soluble types which are used in conventional suspension polymerization or bulk polymerization. Useful initiators are organic peroxides, for example, benzoyl peroxide, lauroyl peroxide, dicumyl peroxide, and the like, and azo compounds such as azobisisobutyronitrile. The amount of these initiators to be used is not restricted, but is generally selected from the range of 0.1 to 5.0 parts by weight for 100 parts by weight of total amount of (a), (b) and (c) to achieve satisfactorily the object of this invention. When less than 0.1 part by weight of an initiator is used, the rate of polymerization reaction becomes low, whilst when more than 5.0 parts by weight of an initiator are used, the rate becomes so high that vigorous heat evolution makes the temperature control difficult, and both melt viscosity and impact resistance of the resin tend to decrease.

In practising this invention, conventional suspending agents such as polyvinyl alcohol, carboxymethyl cellulose, sodium polyacrylate, and phosphates are used. Of these suspending agents sodium polyacrylate has an advantage in that removal of the solvent from the resin formed is facilitated when the latter is separated from the reaction mixture after the polymerization and purified.

In this invention, may be used, if necessary, chain transfer agents including 4 to 16 carbon atom mercaptans such as tert-dodecyl mercaptan and n-dodecyl mercaptan; thiopropionic acid and related compounds; thioglycolic acid and related compounds; carbon tetrachloride and dimeric $\alpha$-methylstyrene. Of these compounds, particularly mercaptans are able not only to act as a chain transfer agent, but also to give excellent impact strength to the objective resin.

In practising this invention, may be used crosslinking agents such as, divinylbenzene, triallycyanurate, triallylisocyanurate, triacrylformal, dimethacrylates of ethylene glycol and related compounds and compounds having two or three double bonds such as divinyl ethers of diethylene glycol. The purpose of using a crosslinking agent is to contribute to the improvement of surface luster and mechanical characteristics, including impact resistance, of the objective resin. The amount of a crosslinking agent to be used is preferably 0.01 to 5.0 parts by weight for 100 parts by weight of total components (a), (b) and (c). When less than 0.01 part by weight of a crosslinking agent is used, surface luster and mechanical characteristics including impact resistance are deteriorated, whilst when more than 5.0 parts by weight are used melt viscosity tends to increase and moldability is deteriorated.

According to this invention, when a solution comprising the aforementioned components (a), (b) and (c) and an organic solvent capable of dissolving the rubbery polymer is suspended in an aqueous medium, it is preferable to use said aqueous medium in an amount of 70 to 400 parts by weight for 100 parts by weight of said mixed solution. If less than 70 parts by weight of the aqueous medium is used, it becomes difficult to obtain the objective thermoplastic resin in the granular form, and, moreover, complication of the polymerization procedure will be set in. The more preferred amount of said aqueous medium is 150–250 parts by weight based on 100 parts by weight of said mixed solution.

Examples are given below to illustrate the invention.

EXAMPLE 1

Into a 500-cc four-necked flask provided with a stirrer and a reflux condenser, are charged 20 g of an ethylene-propylene-diene rubber (EPT-3045, a product of Mitsui Petrochemical Co., Japan; iodine value, 12; Mooney viscosity, $ML_{1+4}(100°C)$, 40; diene component is ethylidene norbornene), 60 g of styrene and 30 g of n-heptane. The mixture is completely dissolved with stirring. After adding a solution comprising 20 g of acrylonitrile containing 1.0 g of benzoyl peroxide as a polymerization initiator, 0.1 g of tert.-dodecyl mercaptan and 15 g of toluene, the contents of the flask are thoroughly stirred to form a homogeneous phase.

Then, an aqueous medium comprising 200 cc of distilled water and 0.5 g of polyvinyl alcohol (KH-17, a suspension stabilizer produced by Nippon Synthetic Chemical Co., Japan) dissolved therein is added to form a suspension. Subsequently, the air in the flask is replaced with nitrogen. The suspension is heated to 70°C, with stirring, allowed to polymerize for 8 hours, and then heated at 80°C for 4 hours to complete the suspension polymerization. Conversion is 95%. The reaction product is filtered and washed with water. After removing the unreacted monomer and n-heptane by steam distillation, the reaction product is dried at 80°C for 8 hours to obtain the objective thermoplastic resin having a particle size of 0.2 to 2.00 mm. In the present Example 1, the suspension was very stable throughout the reaction and absolutely no coagulation was observed.

EXAMPLE 2

Suspension polymerization is carried out using the same components and composition under the same conditions as in Example 1, except that a mixed solvent comprising 10 g of chlorobenzene and 20 g of n-heptane as the solvent, and 0.5 g of benzoyl peroxide as a polymerization initiator are used in place of 30 g of n-heptane, 15 g of toluene and 1.0 g of benzoyl peroxide, respectively. The objective thermoplastic resin having a particle size of 0.2 to 2.0 mm is obtained.

EXAMPLE 3

Into a four-necked flask similar to that used in Example 1, are charged 20 g of a rubbery polymer, EPT-3045, 50 g of styrene and 30 g of toluene. The mixture is completely dissolved with stirring. To the resulting solution, is added a solution comprising 15 g of methyl methacrylate containing as a polymerization initiator 0.45 g of benzoyl peroxide and 0.10 g of azobisisobutyronitrile, 15 g of acrylonitrile, and 0.1 g of tert.-dodecyl mercaptan. The mixture is thoroughly stirred to form a homogeneous phase. In the same manner as in Example 1, the resulting homogeneous solution is suspension-polymerized and the polymer is separated and dried to obtain the objective thermoplastic resin having a particle size of 0.2 to 2.0 mm.

EXAMPLE 4

Into a four-necked flask similar to that used in Example 1, are charged 20 g of EPT-3045 rubbery polymer, 60 g of styrene and 30 g of n-heptane. The mixture is stirred to form a uniform solution. To the solution, is further added a mixed solution comprising 20 g of acrylonitrile containing as a polymerization initiator 0.5 g of benzoyl peroxide dissolved therein, 0.05 g of divinylbenzene and 0.1 g of tert.-dodecyl mercaptan. The mixture is thoroughly stirred to form a homogeneous phase. In the same manner as in Example 1, the resulting homogeneous solution is suspension-polymerized and the polymer is separated and dried to obtain the objective thermoplastic resin having a particle size of 0.2 to 2.0 mm.

EXAMPLE 5

Into a flask similar to that used in Example 1, are charged 25 g of an ethylene-propylene-diene rubber (EP-33, a product of Mitsubishi Petrochemical Co.; iodine value, 24; Mooney viscosity, $ML_{1+4}(100°C)$, 45; diene component is ethylidene norbornene), 55 g of styrene, and 30 g of n-heptane. The mixture is stirred to form a uniform solution. To the solution, is further added a solution comprising 20 g of acrylonitrile containing as a polymerization initiator 0.5 g of benzoyl peroxide dissolved therein and 0.1 g of tert.-dodecyl mercaptan. The mixture is thoroughly stirred to form a homogeneous phase. In the same manner as in Example 1, the resulting homogeneous solution is suspension-polymerized and the polymer is separated and dried to obtain the objective thermoplastic resin having a particle size of 0.2 to 2.0 mm.

EXAMPLE 6

Into a stainless-steel autoclave equipped with a stirrer, a thermometer and a heating jacket, are charged a mixed solvent comprising 10 g of n-heptane and 20 g of toluene, then 20 g of an ethylene-propylenediene rubber (EP-57X, a product of Mitsubishi Petrochemical Co., Japan; iodine value, 15; Mooney viscosity, $ML_{1+4}(100°C)$, 90; diene component is ethylidene norbornene) which has been peroxidized, and 60 g of styrene. The mixture is allowed to dissolve completely. To the resulting solution, was added 20 g of acrylonitrile containing as a polymerization initiator 0.5 g of dicumyl peroxide dissolved therein and 0.1 g of tert.-dodecyl mercaptan. The thus obtained solution is suspension-polymerized at 120°C for 8 hours and thereafter treated in the same manner as in Example 2 to obtain the objective thermoplastic resin having a particle size of 0.2 to 2.0 mm.

EXAMPLE 7

Using 71.8 g of styrene, 24 g of acrylonitrile, and 4.2 g of EPT-3045 rubbery polymer as the rubbery polymer component, suspension polymerization is carried out in otherwise the same manner as in Example 1 to obtain the objective thermoplastic resin having a particle size of 0.2 to 2.0 mm.

EXAMPLE 8

Using 68.3 g of styrene, 22.8 g of acrylonitrile, and 8.9 g of EPT-3045 rubbery polymer as the rubbery polymer component, suspension polymerization is carried out in otherwise the same manner as in Example 1 to obtain the objective thermoplastic resin having a particle size of 0.2 to 2.0 mm.

EXAMPLE 9

Using 64.4 g of styrene, 21.5 g of acrylonitrile, and 14.1 g of EPT-3045 rubbery polymer as the rubbery polymer component, suspension-polymerization is carried out in otherwise the same manner as in Example 1 to obtain the objective thermoplastic resin having a particle size of 0.2 to 2.0 mm.

EXAMPLE 10

Into a four-necked flask similar to that used in Example 4, are charged 20 g of EPT-3045 rubbery polymer, 60 g of styrene and 20 g of n-heptane. The mixture is stirred to form a uniform solution. To the solution, is further added a mixed solution comprising 20 g of acrylonitrile containing as a polymerization initiator 1 g of benzoyl peroxide, 0.05 g of triallylisocyanurate, 0.1 g of tert.-dodecyl mercaptan and 10 g of toluene. The mixture is thoroughly stirred to form a homogeneous phase. To the resulting homogeneous solution, is added an aqueous medium prepared by dissolving 0.15 g of polyvinyl alcohol and 0.3 g of sodium polyacrylate in 250 cc of distilled water, to form a suspension. The resulting suspension is suspension-polymerized in the same manner as described in Example 1 and the polymer is separated and dried to obtain the objective thermoplastic resin having a particle size of 0.2 to 2.0 mm. The surface reflectance (luster; JIS Z 8741-1962) of said resin is 80 percent.

EXAMPLE 11

Into a four-necked flask similar to that used in Example 4, are charged 10 g of EP-57X rubber, 59 g of styrene and 30 g of n-heptane. The mixture is stirred to form a uniform solution. To the resulting solution, is further added a mixed solution comprising 21 g of acrylonitrile containing as a polymerization initiator 1 g of benzoyl peroxide dissolved therein, 10 g of methyl methacrylate, 0.05 g of triallylisocyanurate, 0.1 g of tert.-dodecyl mercaptan and 15 g of toluene. The mixture is thoroughly stirred to form a homogeneous phase and thereafter treated in a manner similar to those described in foregoing Examples to obtain the objective thermoplastic resin, the surface reflectance of which being 85 percent.

EXAMPLE 12

Into a flask similar to that used in Example 5, are charged 15 g of an ethylene-propylene-diene rubber (EP-73X, a product of Mitsubishi Petrochemical Co., Japan; iodine value, 5; Mooney viscosity, $ML_{1+4}(100°C)$, 50; diene component is ethylidene norbornene), 55 g of styrene and 10 g of n-heptane. The mixture is stirred to form a uniform solution. To the solution, is further added a mixed solution comprising 15 g of acrylonitrile containing as a polymerization initiator 0.8 g of benzoyl peroxide dissolved therein, 15 g of methyl methacrylate, 0.2 g of tert.-dodecyl mercaptan, and 5 g of toluene. The mixture is thoroughly stirred to form a uniform solution. In the same manner as described in Example 10, the resulting homogeneous solution is suspension-polymerized and the polymer is separated and dried to obtain the objective thermoplastic resin having a particle size of 0.2 to 2.0 mm.

EXAMPLE 13

Using 60 g of styrene, 20 g of acrylonitrile, and 20 g of butyl rubber (Polysar Butyl 402 produced by Polymer Corporation, Canada; iodine value, 8.2; diene component is isoprene) suspension polymerization is carried out in otherwise the same manner as in Example 1 to obtain the objective thermoplastic resin having a particle size of 0.2 to 2.0 mm.

EXAMPLE 14

In a stainless-steel autoclave equipped with a stirrer, a thermometer and a heating jacket, 30 g of a rubbery polymer, EPT-3045, 53 g of styrene and 37.5 g of n-heptane are placed. The mixture is sufficiently dissolved with heating and stirring. To the resulting solution, a mixed solution containing 17 g of acrylonitrile which dissolves 1 g of benzoyl peroxide as a polymerization inititator, 0.1 g of tert-dodecyl mercaptan and 12.5 g of toluene is added and the contents of the autoclave are stirred to form a substantially homogeneous phase. Then an aqueous medium containing 200 cc of distilled water and 0.5 g of polyvinyl alcohol (KH-17, a suspension stabilizer produced by Nippon Synthetic Chemical Co., Japan) dissolved therein is added to form a suspension. Subsequently, the air in the autoclave is replaced with nitrogen. The suspension is heated to 70°C with stirring, allowed to polymerize for 8 hours, and then heated at 80°C for 4 hours to complete the suspension polymerization. Conversion is 96 percent. The resulting product is filtered and washed with water. After removing the unreacted monomer and the organic solvent by steam distillation, said product is dried at 80°C for 5 hours to obtain the objective thermoplastic resin having a particle size of 0.2 to 2.5 mm.

EXAMPLE 15

In an autoclave similar to that used in Example 14, 30 g of a rubbery polymer, EPT-3045, 52 g of styrene and 37 g of n-heptane are placed. The mixture is sufficiently dissolved with heating and stirring. To the resulting solution, a mixed solution containing 18 g of acrylonitrile which dissolves 1 g of benzoyl peroxile as a polymerization inititator, 0.1 g of tert-dodecyl mercaptan, 0.2 g of triallyl isocyanurate and 13 g of toluene is added and the contents of the autoclave are stirred to form a substantially homogeneous phase. Then an aqueous medium containing 200 cc of distilled water and 0.5 g of polyvinyl alcohol (KH-17) dissolved therein is added to form a suspension. Subsequently, the air in the autoclave is replaced with nitrogen. The suspension is heated to 70°C with stirring, allowed to polymerize for 8 hours, and then heated at 80°C for 4 hours to complete the suspension polymerization. Conversion is 96 percent. The resulting product is treated in the same manner as in Example 14 to obtain the objective thermoplastic resin having a particle size of 0.2 to 2.5 mm.

EXAMPLE 16

In an autoclave similar to that used in Example 14, 35 g a rubbery polymer, EPT-3045, 49 g of styrene and 37.5 g of n-heptane are placed. The mixture is sufficiently dissolved with heating and stirring. To the resulting solution, a mixed solution containing 16 g of acrylonitrile which dissolves 0.8 g of benzoyl peroxile as a polymerization initiator, 0.1 g of tert-dodecyl mercaptan, 0.2 g of triallyl isocyamurate and 12.5 g of toluene is added and the contents of the autoclave are stirred to form a substantially homogeneous phase. Then an aqueous medium containing 200 cc of distilled water and 1 g of polyvinyl alcohol (KH-17) dissolved therein is added to form a suspension. Subsequently, the air in the autoclave is replaced with nitrogen. The suspension is heated to 70°C with stirring, allowed to polymerize for 8 hours, and then heated at 80°C for 4 hours to complete the suspension polymerization. Conversion is 97 percent. The resulting product is treated in the same manner as in Example 14 to obtain the objective thermoplastic resin having a particle size of 0.2 to 2.5 mm.

EXAMPLE 17

In an autoclave similar to that used in Example 14, 40 g of a rubbery polymer, EPT-3045, 45 g of styrene and 37 g of n-heptane are placed. The mixture is sufficiently dissolved with heating and stirring. To the resulting solution, a mixed solution containing 15 g of acrylonitrile which dissolves 0.8 g of benzoyl peroxide as a polymerization initiator, 0.8 g of tert-dodecyl mercaptan and 13 g of toluene is added and the contents of the autoclave are stirred to form a substantially homogeneous phase. Then an aqueous medium containing 200 cc of distilled water and 0.1 g of polyvinyl alcohol (KH-17) dissolved therein is added to form a suspension. Using a procedure similar to that described in Example 14, the objective thermoplastic resin having a particle size of 0.2 to 2.5 mm is obtained by suspension polymerization in conversion of 96 percent.

EXAMPLE 18

In an autoclave similar to that used in Example 14, 45 g of a rubbery polymer, EPT-3045, 43 g of styrene and 37 g of n-heptane are placed. The mixture is sufficiently dissolved with heating and stirring. To the resulting solution, a mixed solution containing 12.0 g of acrylonitrile which dissolves 0.7 g of benzoyl peroxile as a polymerization inititator, 0.7 g of tert-dodecyl mercaptan, 0.3 g of triallyl isocyanurate and 13 g of toluene is added and the contents of the autoclave are stirred to form a substantially homogeneous phase. Then an aqueous medium containing 200 cc of distilled water and 1.0 g of polyvinyl alcohol (KH-17) dissolved therein is added to form a suspension. Using a procedure similar to that described in Example 14, the objective thermoplastic resin having a particle size of 0.2 to 2.8 mm is obtained by suspension polymerization in conversion of 97 percent.

Characteristics of the thermoplastic resins obtained in Examples 1 to 18 are as shown in Table 1.

Table 1

| Item Example No. | Tensile strength, (kg/cm$^2$) | Impact strength, (kg-cm/cm) | Heat distortion temperature (°C) | Rockwell hardness, (R scale) | Flow characteristic, (cc/sec.) |
|---|---|---|---|---|---|
| 1 | 515 | 42 | 81 | 105 | 4.8 × 10$^{-3}$ |
| 2 | 496 | 35 | 82 | 109 | 3.3 × 10$^{-3}$ |
| 3 | 491 | 38 | 91 | 98 | 1.8 × 10$^{-3}$ |
| 4 | 510 | 21 | 92 | 109 | 1.4 × 10$^{-3}$ |
| 5 | 503 | 24 | 86 | 109 | 3.2 × 10$^{-3}$ |
| 6 | 489 | 53 | 84 | 110 | 3.6 × 10$^{-3}$ |
| 7 | 583 | 4 | 71 | 105 | 5.0 × 10$^{-3}$ |
| 8 | 531 | 10 | 75 | 106 | 4.3 × 10$^{-3}$ |
| 9 | 485 | 13 | 83 | 111 | 3.8 × 10$^{-3}$ |
| 10 | 560 | 48 | 85 | 111 | 2.5 × 10$^{-3}$ |
| 11 | 571 | 17 | 83 | 120 | 4.2 × 10$^{-3}$ |
| 12 | 485 | 25 | 82 | 116 | 5.1 × 10$^{-3}$ |
| 13 | 510 | 12 | 81 | 102 | 3.0 × 10$^{-3}$ |
| 14 | 301 | 48 | 76 | 96 | 2.2 × 10$^{-3}$ |
| 15 | 326 | 49 | 75 | 97 | 2.4 × 10$^{-3}$ |
| 16 | 269 | 53 | 70 | 95 | 2.0 × 10$^{-3}$ |
| 17 | 252 | 56 | 68 | 90 | 1.0 × 10$^{-3}$ |
| 18 | 235 | 47 | 65 | 80 | 0.5 × 10$^{-3}$ |

Corresponding testing methods of each item of the tests are as follows: Tensile strength, ASTM D 256–56; Impact strength (Izod impact strength), ASTM D 256-notched; Heat distortion temperature, ASTM D 648–56; Rockwell hardness, ASTM D 785-51. Flow characteristic is measured by means of "koka"-type Flow Tester and expressed in volume (cc) of the resin extruded from the nozzle, 1 mm $\phi$ × 1 mm, per second at 200°C under a load of 20 kg. On the other hand, weather resistance of the resins obtained in Examples 1 to 13 was tested by exposing each resin to UV rays in a Xenon-type Weather Meter and measuring Izod impact strength of the resins at regular intervals. The results obtained are as shown in Table 2.

Table 2

| Item | Izod impact strength, (kg-cm/cm) | | | | |
|---|---|---|---|---|---|
| Exposure period, (hrs.) | 200 | 400 | 600 | 800 | 1,000 |
| Example No. | | | | | |
| 1 | 40 | 37 | 34 | 31 | 28 |
| 2 | 32 | 31 | 29 | 26 | 22 |
| 3 | 37 | 35 | 33 | 29 | 26 |
| 4 | 20 | 18 | 15 | 13 | 10 |
| 5 | 23 | 21 | 19 | 14 | 19 |
| 6 | 52 | 50 | 46 | 38 | 33 |
| 7 | 3.8 | 3.5 | 3 | 2.7 | 2 |
| 8 | 8 | 6 | 4 | 2 | 0.5 |
| 9 | 11 | 9 | 7 | 6 | 3 |
| 10 | 46 | 43 | 40 | 35 | 30 |
| 11 | 15 | 13 | 11 | 10 | 8 |
| 12 | 23 | 20 | 18 | 17 | 15 |
| 13 | 10 | 8 | 6 | 3 | 1 |

Comparative Examples are given below for comparison with the Examples of this invention.

COMPARATIVE EXAMPLE 1

Into a flask similar to that in Example 1, is charged a solution prepared by dissolving 20 g of EPT-3045 rubbery polymer in a mixed solvent comprising 170 g of n-hexane and 170 g of benzene. To the solution, are further added 64 g of styrene, 28 g of acrylonitrile, and 2 g of benzoyl peroxide as a polymerization initiator. The resulting mixture is solution-polymerized at 70°C for 20 hours. After completion of the reaction, isopropyl alcohol is added to the reaction mixture with stirring to precipitate the reaction product and the supernatant liquid is removed by decantation. Methanol is further added to the thus obtained reaction product so as to remove the solvent used therefrom, and then the reaction product is filtered, washed with water, subjected to steam distillation to remove the unreacted monomers and solvent, and dried to obtain a three-component graft-polymer resin.

COMPARATIVE EXAMPLE 2

Solution polymerization is carried out using the same components and composition under the same conditions as in Comparative Example 1, except that polybutadiene is used in place of EPT-3045 rubbery polymer, to obtain a thermoplastic resin in impact resistance.

COMPARATIVE EXAMPLE 3

Into a flask similar to that in Example 1, are charged 19.5 g of polybutadiene, 97.5 g of styrene, 33.0 g of acrylonitrile, 1.9 g of lauroyl peroxide, and 0.43 g of tert.-dodecyl mercaptan. The mixture is stirred to form a uniform solution. To the solution, is added an aqueous medium comprising 300 cc of distilled water and 0.5 g of polyvinyl alcohol dissolved therein, to form a suspension. After the air in the flask is replaced with nitrogen, the reaction system is heated to 75°C while being stirred and kept at this temperature for 8 hours to complete the suspension polymerization. Thereafter, the reaction product is filtered, washed with water and dried at 70°C for 5 hours to obtain a thermoplastic resin.

COMPARATIVE EXAMPLE 4

To 50 g (17.2 g as solids) of polybutadiene latex, under similar conditions to those in Comparative Example 3, are added 63.1 g of styrene, 19.7 g of acrylonitrile, 0.52 g of tert.-dodecyl mercaptan, 1.5 g of lauroyl peroxide as an oil-soluble catalyst, 0.12 g of potassium persulfate as a water-soluble catalyst, 0.7 g of polyvinyl alcohol, and 200 cc of water. The mixture is stirred to form an emulsion system. The emulsified mixture is polymerized by heating at 75°C. As the polymerization proceeds, viscosity of the emulsion increases gradually. After 1.5 to 3.0 hours of continued polymerization, demulsification begins to take place, whereupon a 0.2% aqueous solution of polyvinyl alcohol is added to prevent formation of blocks. The suspension system transformed from the emulsion system is kept at 75°C for further 3 hours to complete the suspension polymerization. Thereafter, the reaction product is treated in a manner similar to that described in Comparative Example 3 to obtain a thermoplastic resin.

Tensile strength, impact strength, deflection temperature under load, hardness, and flow characteristic are measured on the thermoplastic resins obtained in Comparative Examples 1 to 4, in the same way as in Examples. The results obtained are as shown in Table 3. In Table 4, are shown results of test on weatherability of the resins.

Table 3

| Comparative Example No. | Tensile strength, (kg/cm²) | Impact strength, (kg-cm/cm) | Heat distortion temperature (°C) | Rockwell hardness, (R scale) | Flow characteristic, (cc/sec.) |
|---|---|---|---|---|---|
| 1 | 449 | 35.8 | 86 | 98 | $2.6 \times 10^{-3}$ |
| 2 | 430 | 30.3 | 83 | 98 | $3.3 \times 10^{-3}$ |
| 3 | 330 | 40.5 | 81 | 99 | $3.5 \times 10^{-3}$ |
| 4 | 331 | 32.7 | 82 | 96 | $5.1 \times 10^{-3}$ |

Table 4

| Comparative Example No. | Izod impact strength (kg·cm/cm) Exposure period (hrs.) | | | | |
|---|---|---|---|---|---|
| | 200 | 400 | 600 | 800 | 1,000 |
| 1 | 35 | 33 | 30 | 25 | 19 |
| 2 | 15 | 8 | 1.5 | — | — |
| 3 | 22 | 12 | 3.5 | — | — |
| 4 | 16.5 | 9 | 2.5 | — | — |

As is clear from the foregoing disclosure, according to this invention the objective thermoplastic resin can be isolated by simple filtration and trace amounts of the solvent and unreacted monomer remained in the resin can be removed easily by simple means such as washing with water or steam distillation. Such simplicity and efficiency in isolation and purification of the product are of great economical advantage to this invention. On the contrary, in Comparative Example 1, wherein conventional solution polymerization was carried out using EPDM rubber, isolation and purification of the resin are far more complicated and inefficient. On the other hand, characteristics of the resins obtained in Examples are comparable to those of the conventional resin obtained in Comparative Example 1 and are far superior to those of the ABS resins obtained in Comparative Examples 2 to 4.

What is claimed is:

1. A method for producing a thermoplastic graft copolymer resin comprising preparing a solution by dissolving 5 to 45 parts by weight of (a) at least one substantially non-polar rubbery polymer selected from the group consisting of ethylene-propylenediene rubber, butyl rubber and mixtures thereof having an iodine value of 2 to 40, and 95 to 55 parts by weight of a vinyl monomer component including 2 to 98 percent by weight of (b) an aromatic vinyl monomer and 98 to 2 percent by weight of (c) an aliphatic vinyl monomer represented by the general formula $CH_2 = C(R)X$, wherein R is hydrogen, a methyl or ethyl group, and X is $-CN$, $-COOH$, $-COOCH_3$ or $-COOC_2H_5$, in an organic solvent capable of dissolving said non-polar rubbery polymer, the amount of solvent being 5 to 50 parts by weight per 100 parts by weight of the total of components (a), (b) and (c); suspending 100 parts by weight of said solution in 70 to 400 parts by weight of an aqueous medium for forming a suspension of said solution suitable for suspension polymerizing; and suspension-polymerizing in the presence of a polymerization initiator.

2. A method for producing a thermoplastic resin according to claim 1, wherein the non-polar rubbery polymer is at least one rubbery polymer selected from ethylene-propylene-diene rubber and butyl rubber having a Mooney viscosity, $ML_{1+4}(100°C)$, of 25 to 120.

3. A method for producing a thermoplastic resin according to claim 1, wherein the mixing ratio of said vinyl monomer components including the component to the non-polar rubbery polymer component is 90 to 70 parts by weight of the vinyl monomer component to 10 to 30 parts by weight of the non-polar rubbery polymer component.

4. A method for producing a thermoplastic resin according to claim 1, wherein the amount of organic solvent is 20 to 45 parts by weight per 100 parts by weight of the total of said components (a), (b) and (c).

5. A method for producing a thermoplastic resin according to claim 1, wherein said organic solvent is a mixture of an aromatic solvent and an aliphatic solvent.

6. A method for producing a thermoplastic resin according to claim 5, wherein the aromatic solvent is at least one member selected from benzene, toluene, xylene, ethylbenzene and halogen derivatives thereof, and the aliphatic solvent is at least one member selected from heptane, hexane, octane, nonane, halogen derivatives thereof and naphtha.

7. A method for producing a thermoplastic resin according to claim 1, wherein the polymerization initiator is at least one member selected from benzoyl peroxide and dicumyl peroxide.

8. A method for producing a thermoplastic resin according to claim 1, wherein the suspension-polymerization is carried out in the presence of at least one member selected from divinylbenzene, triallylisocyanurate and dimethacrylate of ethylene glycol.

9. A method for producing a thermoplastic resin according to claim 1, wherein the solution is suspended in an aqueous medium in the presence of at least one member selected from polyvinyl alcohol, carboxymethyl cellulose and sodium polyacrylate.

10. A method for producing a thermoplastic resin according to claim 1, wherein the amount of the aqueous medium is 150 to 250 parts by weight per 100 parts by weight of said solution.

11. A method for producing a thermoplastic resin according to claim 1, wherein said solvent is benzene, toluene, xylene, ethylbenzene, diethylbenzene, pentane, hexane, naphtha, 3-methylpentane, 2-methylpentane, 2,2-dimethylpentane, 2,4-dimethylpentane, heptane, octane, nonane, decane, cyclopentane, cyclohexane, methylcyclopentane, methylcyclohexane, chlorobenzene, dichlorobenzene, chloroform, carbon tetrachloride or dichloromethane.

12. A method for producing a thermoplastic graft copolymer resin comprising preparing a solution by dissolving 10 to 30 parts by weight of (a) at least one substantially non-polar rubbery polymer selected from the group consisting of ethylene-propylene-diene rubber, butyl rubber and mixtures thereof having an iodine value of 2 to 40, and 90 to 70 parts by weight of a vinyl monomer component including 60 to 80 percent by weight of (b) an aromatic vinyl monomer and 40 to 20 percent by weight of (c) an aliphatic vinyl monomer represented by the general formula $CH_2 = C(R)X$, wherein R is hydrogen, a methyl or ethyl group, and X is $-CN$, $-COOH$, $-COOCH_3$ or $-COOC_2H_5$, in an organic solvent capable of dissolving said non-polar rubbery polymer, the amount of solvent being 20 to 45 parts by weight per 100 parts by weight of the total of said components (a), (b) and (c); suspending 100 parts by weight of said solution in 150 to 250 parts by weight of an aqueous medium for forming a suspension of said solution suitable for suspension polymerizing; and suspension-polymerizing in the presence of a polymerization initiator.

13. A method for producing a thermoplastic resin according to claim 12, wherein said polymerization initiator is selected from the group consisting of benzoyl peroxide, lauroyl peroxide, dicumyl peroxide, and azobisisobutyronitrile.

14. A method for producing a thermoplastic resin according to claim 12, wherein components (a), (b) and (c) are suspended in said aqueous medium by means of a suspending agent selected from the group consisting of polyvinyl alcohol, carboxymethyl cellulose, sodium polyacrylate and phosphates.

15. A method for producing a thermoplastic resin according to claim 12, wherein polymerization is accomplished in the presence of a chain transfer agent selected from the group consisting of tert-dodecyl mercaptan, n-dodecyl mercaptain, thiopropionic acid, thioglycolic acid, carbon tetrachloride and dimeric α-methylstyrene.

16. A method for producing a thermoplastic resin according to claim 12, wherein polymerization is accomplished in the presence of about 0.01 to 5.0 parts by weight per 100 parts by weight of components (a), (b) and (c) of a cross linking agent selected from the group consisting of divinylbenzene, triallycyanurate, triallylisocyanurate, triacrylformal, dimethacrylates of ethylene glycol and divinyl ethers of diethylene glycol.

17. A method for producing a thermoplastic resin according to claim 12 further comprising recovering said thermoplastic resin by filtering and thereafter washing the filtrate with water.

18. A method for producing a thermoplastic resin according to claim 12 further comprising recovering said thermoplastic resin by filtering and thereafter subjecting said filtrate to steam distillation.

19. A method for producing a thermoplastic resin according to claim 12, wherein said rubbery polymer has a Mooney viscosity, $ML_{1+4}(100°C)$, of 25 to 120.

20. A method for producing a thermoplastic resin according to claim 1, wherein said vinyl monomer component consists essentially of 2 to 98 percent by weight of said aromatic vinyl monomer and 98 to 2 percent by weight of said aliphatic vinyl monomer.

21. A method for producing a thermoplastic resin according to claim 20, wherein said vinyl monomer component consists of 2 to 98 percent by weight of said aromatic vinyl monomer and 98 to 2 percent by weight of said aliphatic vinyl monomer.

22. A method for producing a thermoplastic resin according to claim 12, wherein said vinyl monomer component consists essentially of 60 to 80 percent by weight of said aromatic vinyl monomer and 40 to 20 percent by weight of said aliphatic vinyl monomer.

23. A method for producing a thermoplastic graft copolymer according to claim 22, wherein said vinyl monomer component consists of 60 to 80 percent by weight of said aromatic vinyl monomer and 40 to 20 percent by weight of said aliphatic vinyl monomer.

24. A method for producing a thermoplastic resin according to claim 1, wherein said solution contains 10 to 30 parts by weight of said non-polar rubbery polymer and 90 to 70 parts by weight of said vinyl monomer component.

25. A method for producing a thermoplastic resin according to claim 1, wherein said vinyl monomer component consists essentially of 60 to 80 percent by weight of said aromatic vinyl monomer and 40 to 20 percent by weight of said aliphatic vinyl monomer.

26. A method for producing a thermoplastic resin according to claim 1, wherein said solution contains 20 to 45 parts by weight of said solvent per 100 parts by weight of the total of said components (a), (b) and (c).

* * * * *